(12) United States Patent
Altunc et al.

(10) Patent No.: US 12,546,103 B2
(45) Date of Patent: Feb. 10, 2026

(54) SELF-SLANTED AND WATERPROOF SHOWER FLOOR

(71) Applicant: EVI METAL INOKS YAPI URUNLERI MIMARLIK VE MUTEAHHITLIK INSAAT TAAHHUT SANAYI DIS TICARET LIMITED SIRKETI, Arnavutkoy/Istanbul (TR)

(72) Inventors: Seyit Omer Altunc, Sultangazi/Istanbul (TR); Seyit Murat Altunc, Sultangazi/Istanbul (TR); Seyit Fatih Altunc, Sultangazi/Istanbul (TR)

(73) Assignee: EVI METAL INVOKS YAPI URUNLERI MIMARLIK VE MUTEAHHITLIK INSAAT TAAHHUT SANAYI DIS TICARET LIMITED SIR, Arnavutkoy/Istanbul (TR)

( * ) Notice: Subject to any disclaimer, the term of this patent is extended or adjusted under 35 U.S.C. 154(b) by 235 days.

(21) Appl. No.: 18/270,386

(22) PCT Filed: Dec. 31, 2021

(86) PCT No.: PCT/TR2021/051700
§ 371 (c)(1),
(2) Date: Jun. 29, 2023

(87) PCT Pub. No.: WO2022/146404
PCT Pub. Date: Jul. 7, 2022

(65) Prior Publication Data
US 2024/0068223 A1  Feb. 29, 2024

(30) Foreign Application Priority Data
Dec. 31, 2020 (TR) .................... 2020-22811

(51) Int. Cl.
*E03F 5/04* (2006.01)
*A47K 3/40* (2006.01)

(52) U.S. Cl.
CPC .............. *E03F 5/0408* (2013.01); *A47K 3/40* (2013.01)

(58) Field of Classification Search
CPC ........ E03F 5/0408; E03F 5/0407; A47K 3/40; A47K 3/405
See application file for complete search history.

(56) References Cited

U.S. PATENT DOCUMENTS 9,322,157 B1 * 4/2016 Ismert .................. F16L 37/248
2011/0047695 A1 3/2011 Niedens
(Continued)

FOREIGN PATENT DOCUMENTS

TR   2019906250 U5   5/2019

*Primary Examiner* — Janie M Loeppke
(74) *Attorney, Agent, or Firm* — Koivula & Somersalo, LLC (57) ABSTRACT

A water drain that is used in areas with wet floors such as kitchens, bathrooms, toilets, terraces, balconies, gardens, and ensures that the water to be evacuated is transmitted to the sewer and characterized in that; including primary body, floor drain and waterproofing membrane integrated with flange to ensure a complete sealing by wrapping the usage area all around with the bundling method without being exposed to any damage by cutting during the process of dimensioning the body by cutting according to application area, without the need of cutting and patching processes.

15 Claims, 8 Drawing Sheets

(56) References Cited

U.S. PATENT DOCUMENTS

| | | | |
|---|---|---|---|
| 2014/0131996 A1* | 5/2014 | Murphy | E03F 5/0409 |
| | | | 285/136.1 |
| 2014/0259371 A1 | 9/2014 | Schaffer | |
| 2015/0240464 A1 | 8/2015 | Meyers | |
| 2015/0292662 A1* | 10/2015 | Majocka | E03F 5/041 |
| | | | 29/527.1 |
| 2016/0007810 A1* | 1/2016 | Andres Alemany | ......... |
| | | | B29C 45/0053 |
| | | | 427/289 |
| 2018/0073237 A1* | 3/2018 | Say | E03F 5/0407 |
| 2018/0179840 A1 | 6/2018 | Varkey et al. | |

* cited by examiner

SELF-SLANTED AND WATERPROOF SHOWER FLOOR

CROSS REFERENCES

This application is a U.S. national stage application of international patent application number PCT/TR2021/051700 filed on Dec. 31, 2021, claiming priority to Turkish national application 2020/22811 filed on Dec. 31, 2020.

TECHNICAL FIELD

The invention relates to water drains used in areas with wet floors such as kitchens, bathrooms, toilets, terraces, balconies, and gardens, which ensure that the water to be discharged is transmitted to the sewer.

PRIOR ART

Areas that are constantly exposed to water are called wet area floors or wet area volumes. In wet area floors, point drains or linear shower channels are assembled in the installation. Point drains and linear shower channels are also known as floor drain in the prior art.

In the prior art, in the installation of wet area floors, the floor is raised as much as the floor drain while the floor drain is mounted on the installation pipe. When the ground and floor drain are flush, the surfaces of the wet area should have an average of 2% inclination towards the drain. In this way, it is ensured that the water is easily discharged from the floor drain. Afterwards, the work is completed by performing the waterproofing work and surface coating (ceramic etc.).

The most important point to be considered in wet area floors in the prior art is that the slope to be reflected on the floor is in the right direction. On the contrary, the consequence of accumulation of water at undesirable points or not being able to be discharged at an adequate level may be encountered. However, the same quality cannot always be achieved because the floor work is based on handwork.

After the slanted floor is achieved, waterproofing is applied. Especially in applications made using waterproofing membrane, patch pieces are used on the edges of the floors, corners and around the floor drain. While the reliability of these patches are questioned in terms of impermeability, they also cause serious loss of time.

Shower floor is mentioned in the American patent document coded US2014259371A1 in the prior art. Shower floor contains the drain plate, a structural base, a mortar bed extending upwards from an aforementioned surface, a drain plate on said substrate up to a position level with an upper surface, a tile substrate defining a floor area adjacent to said shower floor. The product in the mentioned patent document is difficult to assemble. Additional patch pieces are used to provide waterproofing.

In the national patent application with the code 2019/06250 included in the prior art, a wall type water drain containing slanted ceramics is mentioned. The said water drain consists of a ceramic bonding surface that allows the dropper frame to be adhered to the ceramic material by eliminating the incompatibility that may occur between the frame used in the water drains and the floor, and a slanted ceramic positioned so that the water to be discharged flows into the frame hole. The slanted surface is obtained by carving the upper surface of the ceramic used. Also, it cannot be used in floor type water drains.

The process, which is considered as beveling work, floor drain installation and waterproofing application, requires a serious time. Loss of time is recorded in expense items as labor service, alongside with the fact that it is prolonging the construction period.

PURPOSE OF THE INVENTION

The aim of the invention is to obtain a fast and easy-to-apply fully impermeable water drain where the water can be evacuated easily as a result of providing the correct floor slope.

Another aim of the invention is to obtain a water drain where correct slope and problem-free waterproofing can be provided on all surfaces.

Another aim of the invention is to obtain water drainage where the slanted body can be dimensioned in accordance with the project without damaging the waterproofing membrane.

Another aim of the invention is to obtain water drainage where the impermeability can be guaranteed without the need for additional patching.

Self-slanted and waterproof ready-made shower floor, developed to achieve the aforementioned purposes, includes primary body ($8.1$, $8.3$), floor drain ($1a$, $1b$) and waterproofing membrane ($7$) integrated with flange ($5a$, $5b$) to ensure a complete sealing by wrapping the usage area all around with the bundling method without being exposed to any damage by cutting during the process of dimensioning the body by cutting according to application area, without the need of cutting and patching processes,

DESCRIPTION OF FIGURES

Attached

The main parts expressed in the figures are given below as numbers and names.

($1a$) Floor drain
($1b$) Floor drain
($2$) Height adjustment piece
   ($2.1$) Protective cover
   ($2.2$) Groove
($3$) Lock piece
   ($3.1$) Indent
   ($3.2$) Locking protrusion
   ($3.3$) Groove (4) Pipe piece
(5a) Flange
(5b) Flange
   (5.1) Locking channel
(6) Gasket
(7) Waterproofing membrane
   (8.1) Primary body
   (8.2) Additional body
   (8.3) Primary body
   (8.4) Additional body
   (8.5) Connection point
(9) Locking key
H1: Minimum height of the body
H2: Maximum height of body Explanation of the Invention The invention relates to water drains used in areas with wet floors such as kitchens, bathrooms, toilets, terraces, balconies, and gardens, which ensure that the water to be discharged is transmitted to the sewer.

The self-slanted and waterproof shower floor, which is the subject of the invention, can be used in two different water drainage systems. The first is the systems in which a point floor drain (1a) is used, in which the water to be evacuated is discharged from the middle of the shower. In systems where a point drain is used, a point drain flange (5a), a primary body (8.1) for a point drain, and an additional body (8.2) for a point drain are used. The second is the systems in which a linear floor drain (1b) is used. In this type of water drainage systems, the water to be discharged is sent to the installation from a place close to the wall. In systems where the aforementioned linear floor drain (1b) is used, linear shower channel includes flange (5b), primary body (8.3) for linear shower channel and additional body (8.4) for linear shower channel.

The water to be evacuated on the self-slanted and waterproof shower floor, whether is desired to be sent from the middle of the shower of or close to the wall to the installation, includes all parts of the height adjustment piece (2), the lock piece (3), the pipe piece (4), the gasket (6) and the waterproofing membrane (7) in common.

Point floor drain (1a) and linear floor drain (1b) are inbox point or linear shower channels which are flush with floor coverings such as ceramics, marble etc. They can be changed as point or linear according to the area used. In alternative applications of the invention, point floor drain (1a) and linear floor drain (1b) can also be produced from different materials other than inbox.

Height adjustment piece (2) is the part that helps to adjust the height difference between the floor and the floor drain (1a, 1b) and to prevent unwanted parts from escaping into the installation drain, thanks to its protective cover (2.1).

The remaining diameter after removing the protective cover (2.1) from the height adjustment piece (2) is larger than the part of the floor drain (1a, 1b) that passes into the height adjustment piece (2). In this way, the floor drain (1a, 1b) can move freely within the height adjustment piece (2), providing flexibility and convenience to the applicator during the surface coating application and jointing process.

Lock piece (3) is the part that compresses and secures the pipe piece (4) towards the gasket (6) by passing through the flange (5a, 5b) channels. There are locking protrusion (3.2) and indents (3.1) and grooves (3.3) on the lock piece (3).

Pipe piece (4) provides the connection of the system to the installation drain pipe. Said pipe piece (4) has a long length so that it can be easily applied in all installation systems. Where the long pipe piece (4) is not needed, it can be easily cut and applied to the relevant area.

Point drain flange (5a) is produced integrally with the primary body (8.1) for the point drain. Linear shower channel flange (5b) is produced integrally with the primary body (8.3) for the linear shower channel. The point drain flange (5a) or the linear shower channel flange (5b) is the part that allows to build on top of other parts used in the water drainage system.

Gasket (6) is produced integrally with point drain flange (5a) or linear shower channel flange (5b). Said gasket (6) is the part that provides the impermeability between the plastic parts, that is, the waterproofing of the whole system. Waterproofing membrane (7) is the part that directs the leaks to be experienced in surface coating applications such as ceramic, marble, etc. by covering the system, thanks to its waterproof structure.

Figure 9:
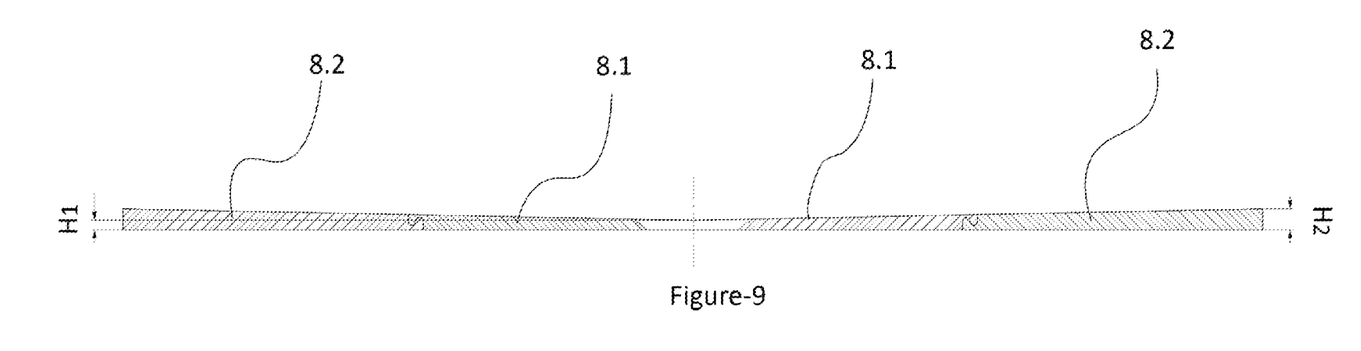
FIG. 9 is the cross-sectional view of the body for the point floor drain.

For the point drain, the primary body (8.1) has a slope of 0.1% to 5% in the downstream direction. In the preferred application of the invention, the primary body (8.1) for the point drain is inclined by 2% in the direction of the drain. FIG. 9 shows the cross-sectional view of the primary body (8.1) for the point drain and the additional body (8.2) for the point drain. The height H2 shown in the aforementioned sectional view is bigger than the height H1. However, for the said point drain, the primary body (8.1) is produced integrally with the waterproofing membrane (7) and the point drain flange (5a).

The primary body (8.1) for the point drain, the additional body (8.2) for the point drain, the primary body (8.3) for the linear shower channel and the additional body (8.4) for the linear shower channel are produced from PU (polyurethane) material. In alternative applications of the invention, EPS (Expanded Polystyrene Rigid Foam-Expanded Polystyrene Foam) and XPS (Compressed Polystyrene Foam-Extruded Polystyrene Foam) materials can also be produced.

The primary body (8.1) for the point drain, the additional body (8.2) for the point drain, the primary body (8.3) for the linear shower channel and the additional bodies (8.4) for the linear shower channel are cuttable. In this way, slanted ground can be obtained in desired dimensions according to the application area.

The primary body (8.1) for the point drain, the additional body (8.2) for the point drain, the primary body (8.3) for the linear shower channel and the additional bodies (8.4) for the linear shower channel are placed on the adhesive mortar on the floor. The said primary bodies (8.1, 8.3) and additional bodies (8.2, 8.4) are prevented from moving on the ground through mortar.

Primary bodies (8.1, 8.3) and additional bodies (8.2, 8.4) are fixed to each other by being pieced together from their connection points (8.5). Additional bodies (8.2, 8.4) are added one after the other to form a slanted floor in the direction of the drain through the connection points (8.5) depending on the size of the shower area. Connection points (8.5), primary bodies (8.1, 8.3) and additional bodies (8.2, 8.4) are mechanically locked to each other. After the additional bodies (8.2, 8.4) are applied to the entire shower area, the waterproofing membrane (7) is adhered to ensure the waterproofing of the relevant shower area.

The additional body (8.2) for the point drain has a slope of 0.1% to 5% in the drain direction. In the preferred application of the invention, the additional body (8.2) for the point drain is inclined by 2% in the direction of the drain. However, the additional body (8.2) for the said point drain is produced integrally with the waterproofing membrane (7).

The primary body (8.3) for the linear shower channel has a slope of 0.1% to 5% in the drain direction. In the preferred application of the invention, the primary body (8.3) for the linear shower channel is inclined by 2% in the direction of the drain.

Figure 1:
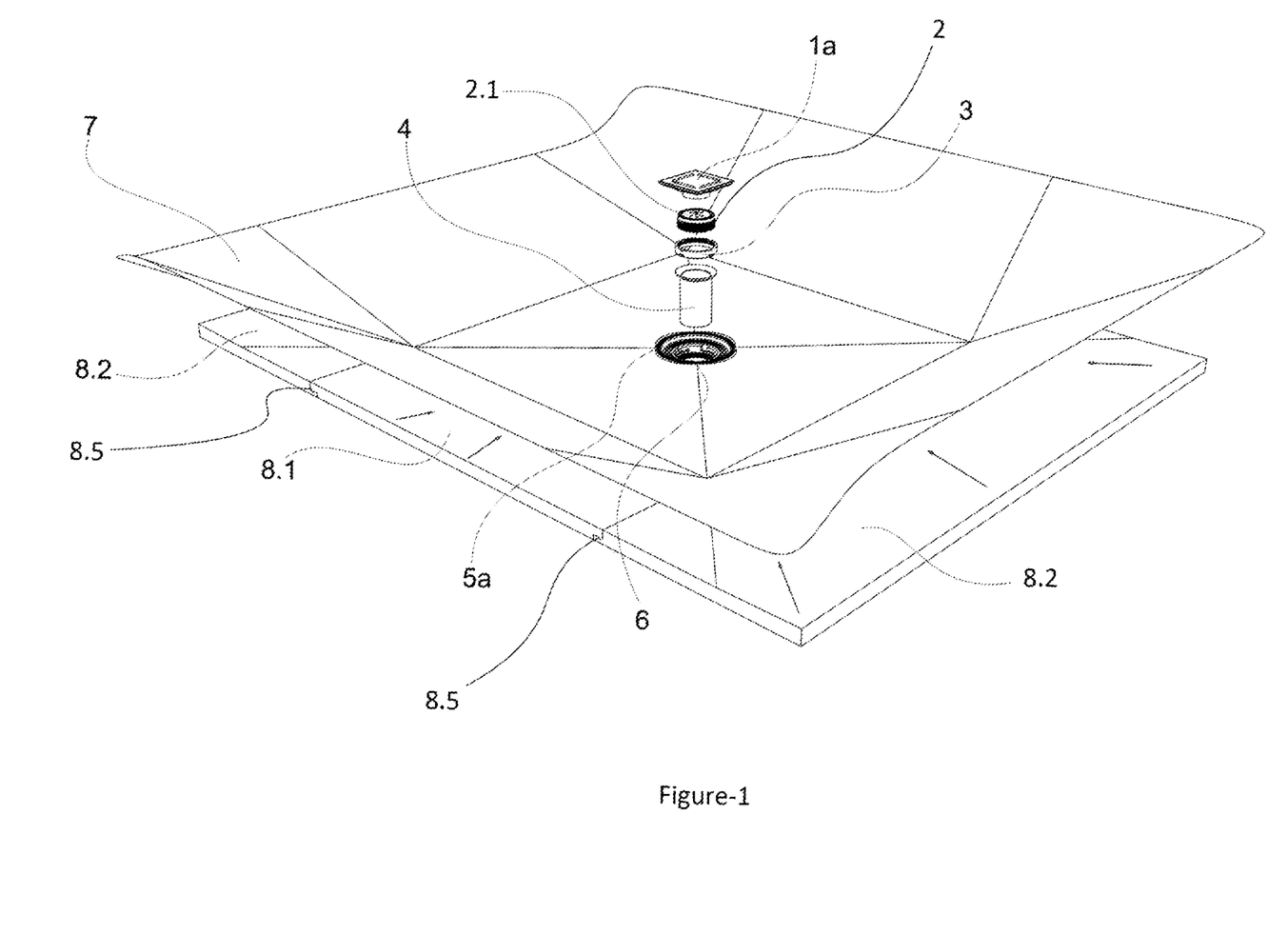
FIG. 1 is the perspective view of the self-slanted and waterproof ready-made shower floor with a point floor drain used.
Figure 2:
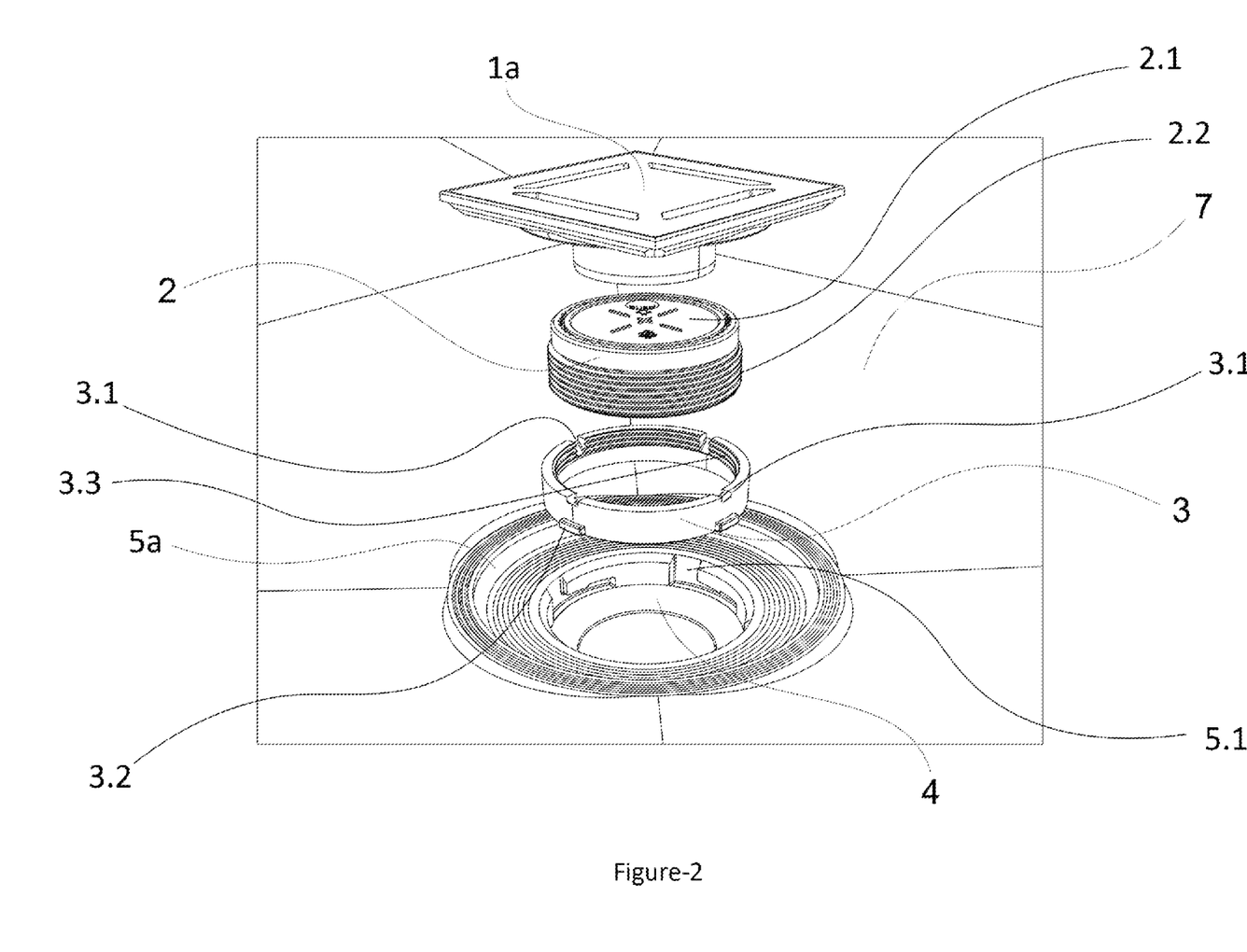
FIG. 2 is the detail view of the self-slanted and waterproof ready-made shower floor with a point floor drain.
Figure 3:
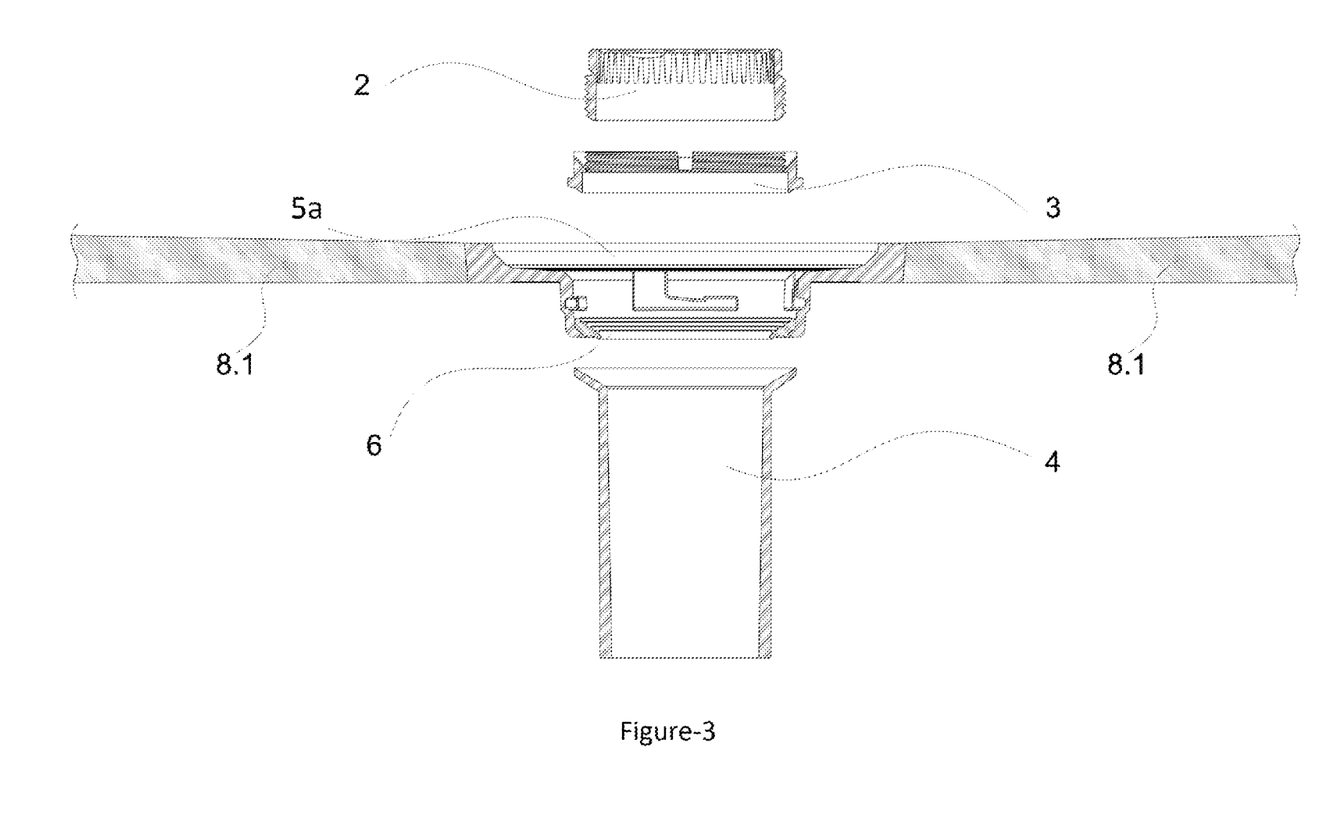
FIG. 3 is the cross-sectional view of the self-slanted and insulated shower floor with a point floor drain.
Figure 4:
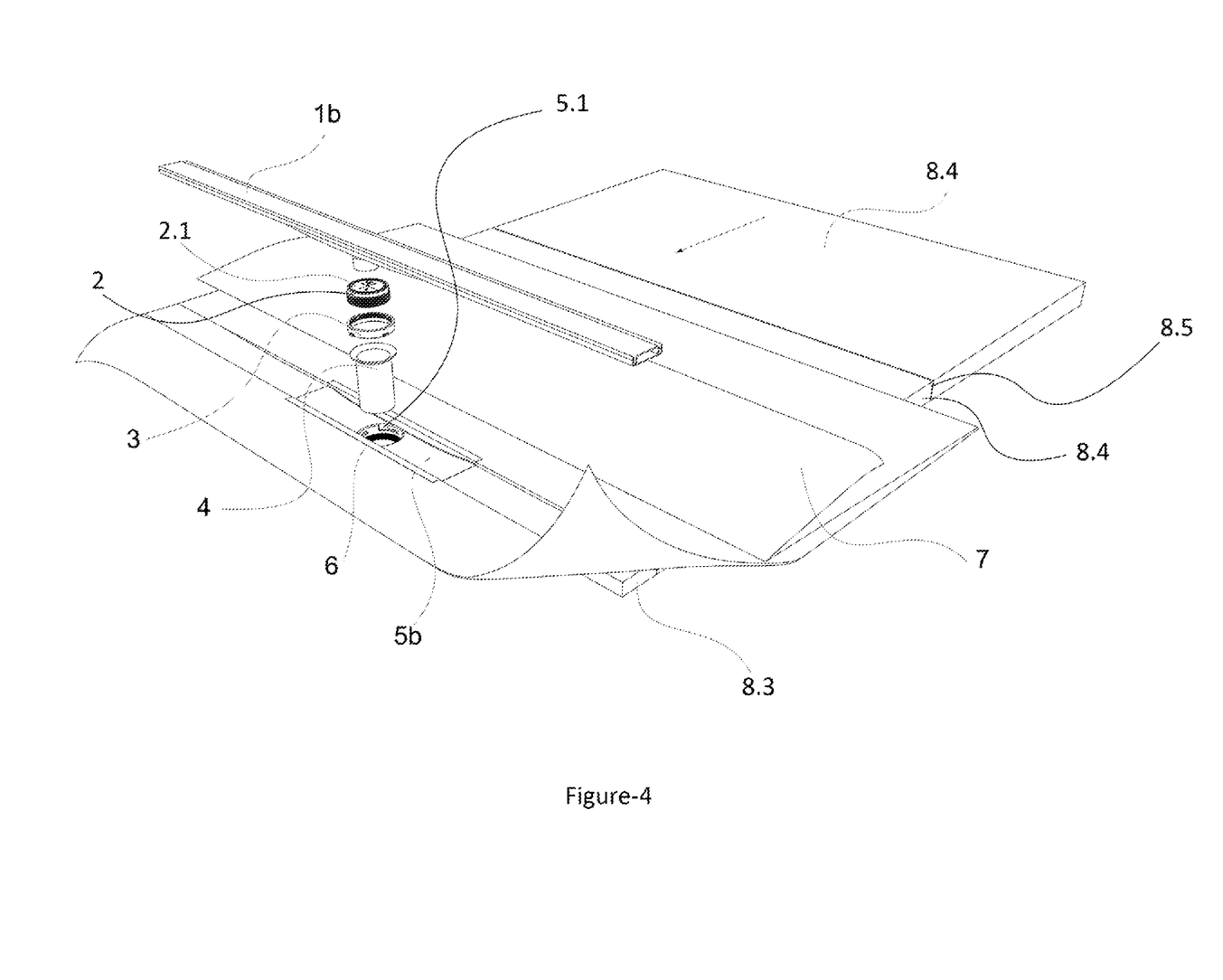
FIG. 4 is the perspective view of the self-slanted and waterproof shower floor with a linear floor drain.
Figure 5:
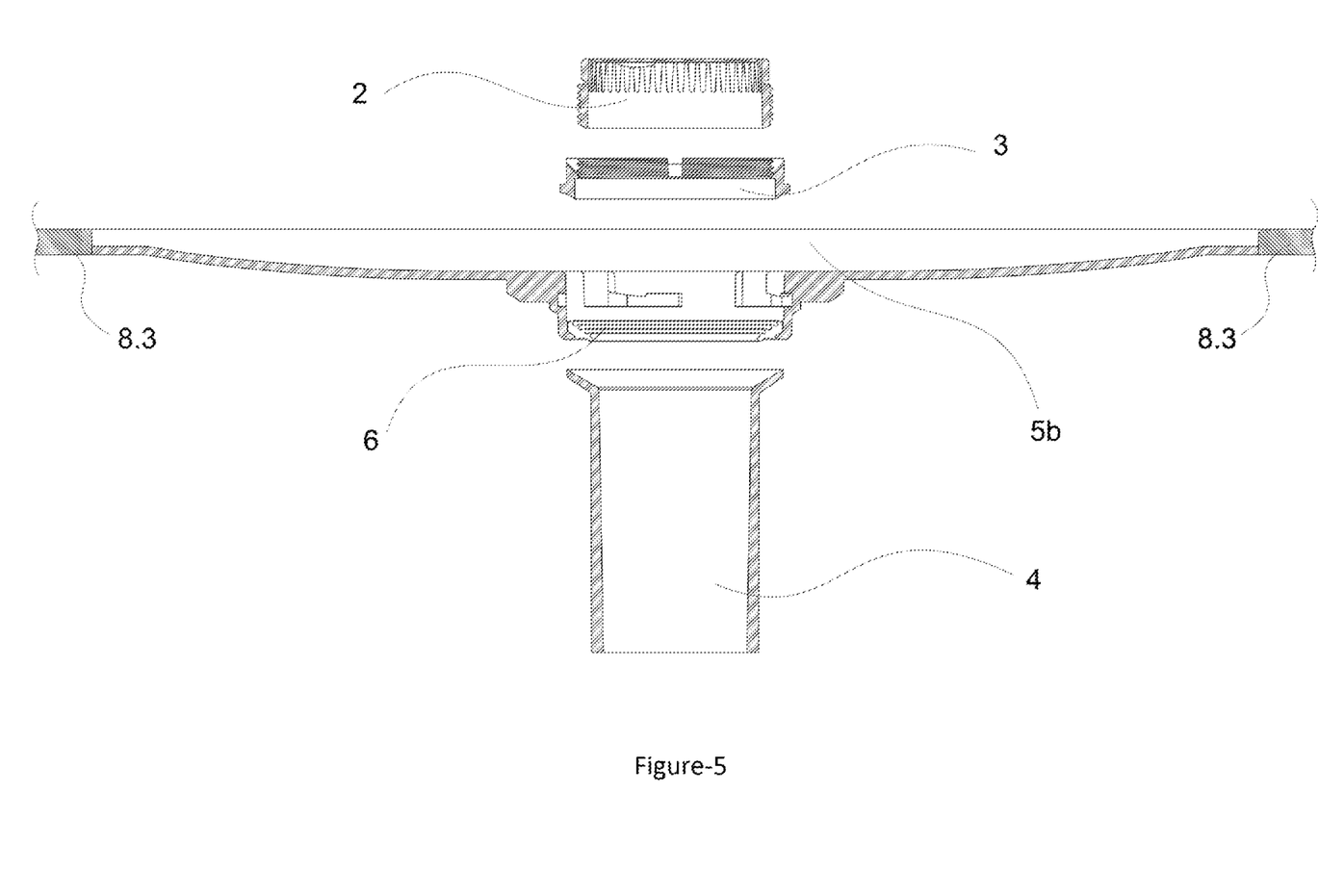
FIG. 5 is the cross-sectional view of the self-slanted and waterproof shower floor with a linear floor drain.
Figure 6:
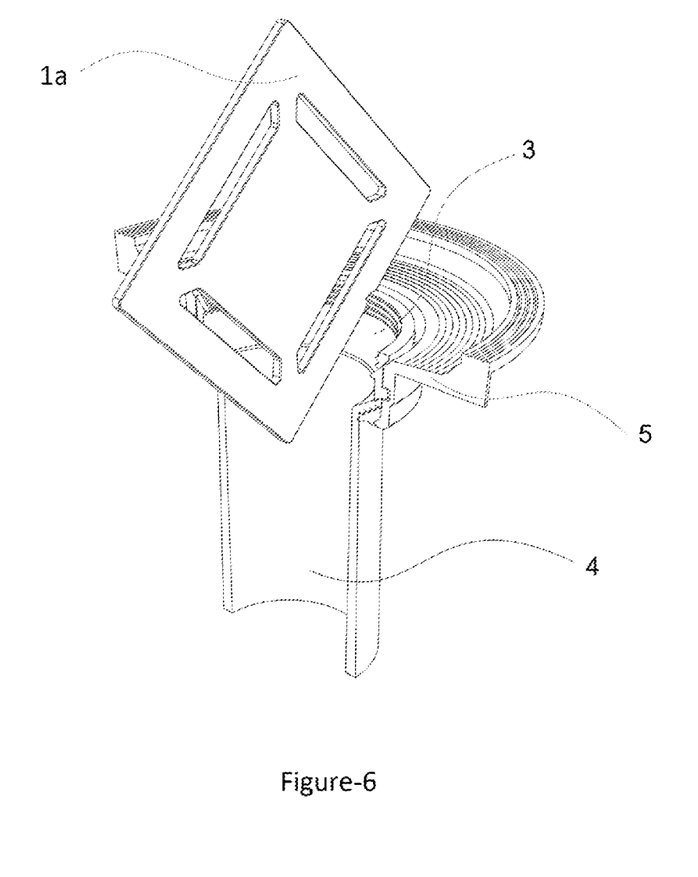
FIG. 6 is the perspective section view of the locking moment of the lock piece used in water drainage systems where a point floor drain is used.
Figure 7:
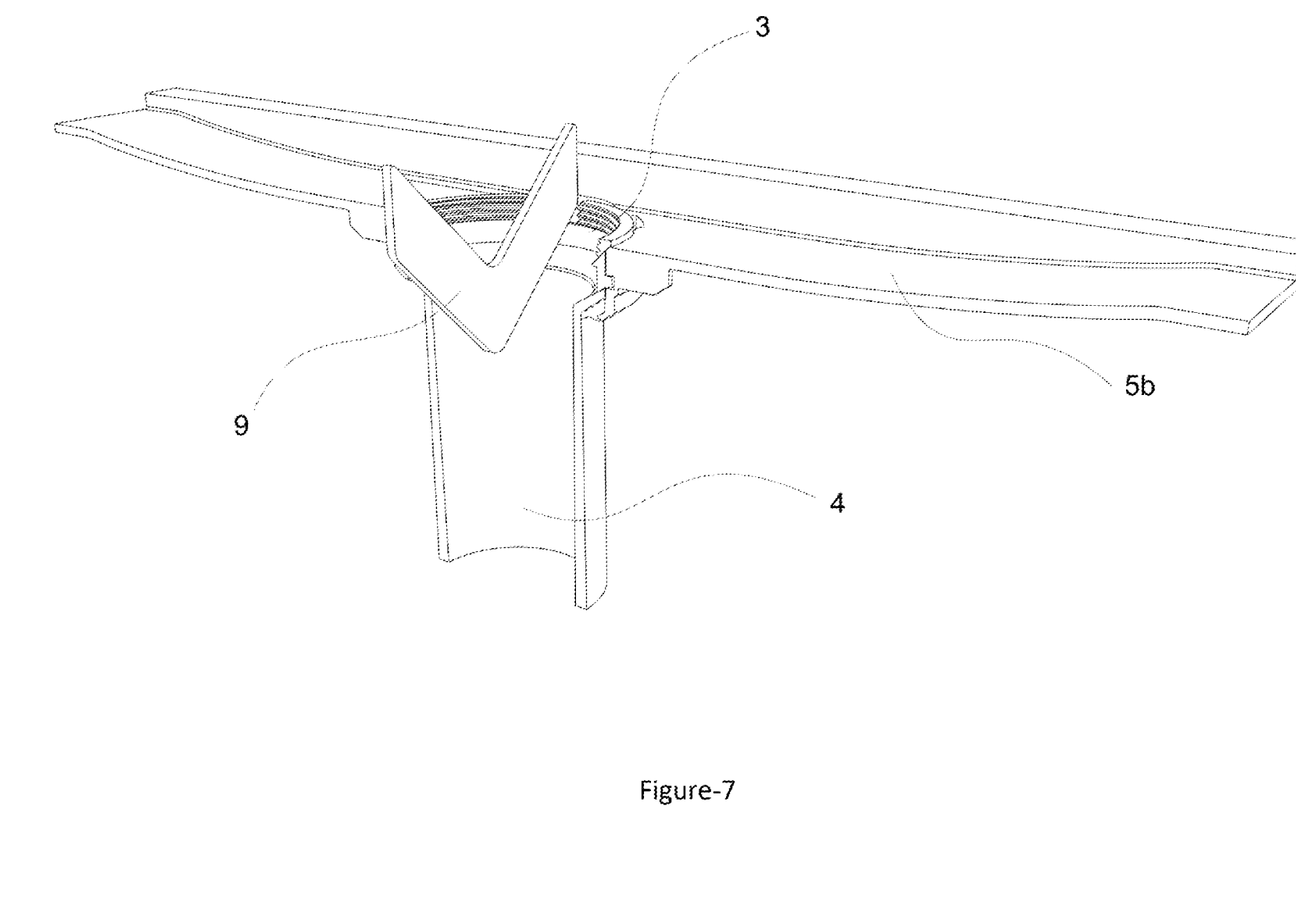
FIG. 7 is the perspective section view of the locking moment of the lock piece used in water drainage systems where a linear shower channel is used.
Figure 8:
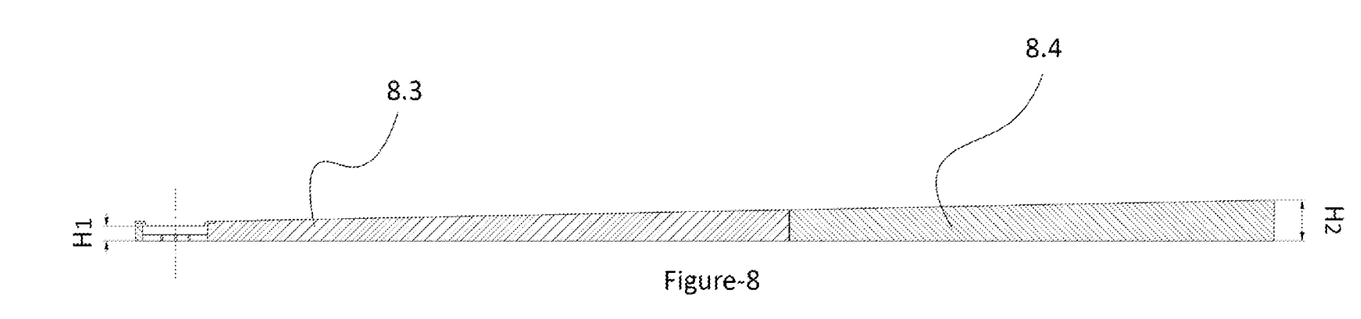
FIG. 8 is the cross-sectional view of the body for the linear shower channel.

FIG.8 shows the cross-sectional view of the primary body (8.3) for the linear shower channel and the additional body (8.4) for the linear shower channel. The height H2 shown in the aforementioned sectional view is greater than the height H1. However, for the said linear shower channel, the primary body (8.3) is produced integrally with the waterproofing membrane (7) and the linear shower channel flange (5*b*). In this way, a possible water leakage on the linear shower channel flange (5*b*) is secured.

The additional body (8.4) for the linear shower channel has a slope of 0.1% to 5% in the drain direction. In the preferred application of the invention, the additional body (8.4) for the linear shower channel is inclined by 2% in the direction of the drain. However, the additional body (8.4) for the said linear drain is produced integrally with the waterproofing membrane (7).

The application of the self-slanted and waterproof ready-made shower floor, which is the subject of the invention, is done in the following order:

Determining the dimensions of the wet area to be applied, the dimensions of the primary body (8.1) for the point drain and the additional body (8.2) for the point drain or the primary body (8.3) for the linear shower channel and the additional body (8.4) for the linear shower channel and making them ready for application, Installing the system on the floor with adhesive mortar so that the point where the installation drain is located and the flange (5*a*, 5*b*) integrated into the body coincide from the center, Joining the pipe piece (4) with the installation drain by applying glue to its lower point and passing it through the flange (5*a*, 5*b*), Then, connecting the pipe piece (4) adhered to the installation securely with the mentioned flanges (5*a*, 5*b*) by turning the lock piece (3) along the channels on the flange (5*a*, 5*b*) until a "click" sound is heard.

Locating the height adjustment piece (2) into the lock piece (3) by rotating it, Adhering the waterproofing membrane (7) to the parts of the body that are not adhered, If necessary, sticking the remaining parts by bending them towards the walls, Applying adhesive mortar for ceramic, marble, etc. to be applied to the surface and meanwhile, testing the height of the floor drain (1*a*, 1*b*) with the surface coating and bringing the height adjustment piece (2) to the desired position.

Continuous application of waterproofing membrane (7) minimizes the risk of water leakage. It also saves time by saving the applicator from the trouble of patching.

The height adjustment piece (2) includes a protective cover (2.1). The protective cover (2.1) prevents any foreign substance from entering the installation drain during the application.

Point floor drain (1*a*) and linear floor drain (1*b*) and slanted body and waterproofing membrane (7) are blended as a whole. The slanted body can be easily cut according to the shower area to be applied. In the meantime, the waterproofing membrane (7) is not damaged by the cutting process. Because the waterproofing membrane (7) is attached to an area of 76 cm×76 cm only in the center of the body. The mentioned 76 cm×76 cm size area is the standard minimum shower area size. Thus, the inclined body is sized in accordance with the project without damaging the waterproofing membrane (7). In addition, the waterproofing membrane (7) is left longer than all the surfaces of the slanted body. Thanks to its long size, it is plastered towards the walls, ensuring the impermeability without the need for additional patching.

The invention includes a waterproofing membrane (7) integrated with the primary body (8.1, 8.3), the floor drain (1*a*, 1*b*) and the flange (5*a*, 5*b*) to provide a complete impermeability by wrapping the usage area all around with the bundling method without the need for cutting and patching operations. In this way, possible percolation from the walls as well as the floor are completely prevented.

The installation connection of the complete product is provided by the flange (5*a*, 5*b*) and the additional pipe piece (4) with gasket (6) integrated into the primary bodies (8.1, 8.3). In this way, a very practical installation connection is obtained.

In the system of the invention, there is an extra lock piece (3) to strengthen the installation connection and to make the gasket (6) more effective. In order to notify the applier that the system is connected with the drain, the lock piece (3) makes a "click" sound during locking. Said "click" sound is obtained thanks to the flexible plastic material of the lock piece (3) and the flange (5*a*, 5*b*). The locking protrusion (3.2) on the lock piece (3) pass through the locking channels (5.1) on the flange (5*a*, 5*b*) by force and stretching until they reach a certain point during rotation. After a certain point, it gets rid of the bottleneck and hits the end point of the flange (5*a*, 5*b*), making a "click" sound.

There are grooves (2.2) on the outside of the height adjustment piece (2). Said grooves (2.2) are in such a size and shape that they can enter the grooves (3.3) on the inside of the lock piece (3). Height adjustment piece (2) and lock piece (3) are mechanically locked to each other with said grooves (2.2, 3.3). In addition, the height adjustment of the height adjustment piece (2) is made with the mentioned grooves (2.2, 3.3).

The locking indents (3.1) on the locking piece (3) guide the locking of the said locking piece (3) to the flange (5*a*, 5*b*). In the areas where the linear floor drain (1*b*) is used, locking is done with the locking key (9). In the shower areas where the point floor drain (1*a*) will be used, locking is done with the help of the point floor drain (1*a*). The edge of the point floor drain (1*a*) acts as a locking key (9). In this way, it is ensured that the slanted shower floor is locked without the need to use any additional auxiliary tools.

A height adjustment piece (2) is available to adjust the height difference in materials such as ceramics or marbles to be used as floor coverings. Whether it is a ceramic or marble floor, the difference between the floor drain (1*a*,1*b*) and the floor is eliminated. Considering that all this process is implemented with precedent methods, a serious time saving is achieved. In addition, a wet area work is carried out in which the slope of the ground and the impermeability are absolutely secured.

A water drain that is used in areas with wet floors such as kitchens, bathrooms, toilets, terraces, balconies, gardens, and ensures that the water to be evacuated is transmitted to the sewer and characterized in that; including primary body (8.1, 8.3), floor drain (1*a*, 1*b*) and waterproofing membrane (7) integrated with flange (5*a*, 5*b*) to ensure a complete sealing by wrapping the usage area all around with the bundling method without being exposed to any damage by cutting during the process of dimensioning the body by cutting according to application area, without the need of cutting and patching processes.

The invention claimed is:

1. A self-slanted, waterproof ready-made shower floor assembly comprising:
   a primary body comprising a flange configured to be connected with a pipe piece adapted to be connected with an installation drain;
   at least one additional body configured to be mechanically connected with the primary body on an outer perimeter of the primary body;
   a floor drain integrated with the primary body; and
   a waterproofing membrane integrated with the flange, wherein:
   the primary body and the at least one additional body each have a directional slope in a range of 0.1-5% toward the floor drain, and
   the water proofing membrane integrated with the flange is larger than the area of the primary body and is adapted to be adhered on top of the primary body and the at least one additional body upon installation of the shower floor.

2. The self-slanted, waterproof ready-made shower floor assembly of claim 1, further comprising;
   a lock piece configured to secure the flange to a pipe piece adapted to be attached to an installation drain, wherein the lock piece has locking protrusions configured to provide—a "click" sound to indicate secure locking.

3. The self-slanted, waterproof ready-made shower floor assembly of claim 1, wherein the flange is a circular or rectangular point drain flange.

4. The self-slanted, waterproof ready-made shower floor assembly of claim 1, wherein the flange is an elongated linear strainer flange.

5. The self-slanted, waterproof ready-made shower floor assembly of claim 1, wherein the slope of the primary body and the additional body is 2%.

6. The self-slanted, waterproof ready-made shower floor assembly of claim 1, further including a height adjustment piece containing a protective cover.

7. The self-slanted, waterproof ready-made shower floor assembly of claim 1, further including a lock piece.

8. The self-slanted, waterproof ready-made shower floor assembly of claim 7, wherein the height adjustment piece includes grooves on an outside surface that are compatible with grooves on an inside surface of the locking-piece.

9. The self-slanted, waterproof ready-made shower floor assembly of claim 7, wherein the lock piece includes a locking indent that guides the locking of the flange.

10. The self-slanted, waterproof ready-made shower floor assembly of claim 1, wherein the primary body is made of cuttable material.

11. The self-slanted, waterproof ready-made shower floor assembly of claim 1, further including a gasket, which is produced integrally with the flange and provides the waterproofing of the system.

12. The self-slanted, waterproof ready-made shower floor assembly of claim 1, wherein the flange is a circular or rectangular point floor drain and/or an elongated linear floor drain that is at level with floor coverings.

13. The self-slanted, waterproof ready-made shower floor assembly of claim 1, wherein the flange is an elongated linear flange and the self-slanged, waterproof ready-made shower floor assembly comprises a locking key configured to lock a lock piece to the flange.

14. A method to provide water drains in areas with wet floors ensuring water discharge to the sewer and including the process steps of:
   a) determining dimensions of the wet area,
   b) providing a primary body comprising a flange, wherein the flange is integrated with a waterproofing membrane, and at least one additional body, wherein a combined area of the primary body and the at least one additional body equals to the wet area,
   c) locking the primary body and the at least one additional body mechanically to each other;
   d) installing the locked bodies of step c) on the floor with an adhesive mortar so that the the flange integrated into the body coincide from a center with an installation drain;
   e) joining a pipe piece with the installation drain by applying glue to a lower end of the pipe piece and passing the pipe piece through the flange;
   f) securing connection of the pipe piece to the flange by turning a lock piece along channels on the flange until a "click" sound;
   g) locating a height adjustment piece into the lock piece by rotating the height adjustment piece;
   h) adhering the waterproofing membrane to the at least one additional body; and
   i) applying adhesive mortar for attaching surface material.

15. The method of claim 14, further comprising a step of sticking any unadhered parts of the waterproofing membrane towards the walls before the step i).

* * * * *